(12) United States Patent
Sleator

(10) Patent No.: US 9,377,349 B2
(45) Date of Patent: Jun. 28, 2016

(54) FREE-SPACE OPTICALLY ACCESSED ACOUSTICALLY MODULATED RETRO-REFLECTOR ARRAYS

(71) Applicant: Google Inc., Mountain View, CA (US)

(72) Inventor: Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 13/974,162

(22) Filed: Aug. 23, 2013

(65) Prior Publication Data

US 2015/0053016 A1 Feb. 26, 2015

(51) Int. Cl.
*G01H 9/00* (2006.01)
(52) U.S. Cl.
CPC ........................................ *G01H 9/00* (2013.01)
(58) Field of Classification Search
CPC .......................................................... G01H 9/00
USPC ............................................................ 73/655
See application file for complete search history.

(56) References Cited

U.S. PATENT DOCUMENTS

| | | | |
|---|---|---|---|
| 4,361,911 A * | 11/1982 | Buser | G01S 17/74 342/45 |
| 4,522,466 A * | 6/1985 | Lindig | G06E 3/005 359/308 |
| 5,732,046 A | 3/1998 | O'Donnell et al. | |
| 6,285,806 B1 | 9/2001 | Kersey et al. | |
| 8,076,737 B2 | 12/2011 | Youngner | |
| 8,499,637 B1 * | 8/2013 | Blackmon | G01N 29/2418 367/149 |
| 2002/0018285 A1 * | 2/2002 | Worner | G01S 7/497 359/298 |
| 2003/0053015 A1 * | 3/2003 | Minoura | G02B 5/124 349/113 |

* cited by examiner

*Primary Examiner* — J M Saint Surin
(74) *Attorney, Agent, or Firm* — Morris & Kamlay LLP

(57) ABSTRACT

Systems and techniques are provided for transmitting a light towards a plurality of acousto-optic retro reflectors, arranged as an array, that are configured to physically react to an acoustic signal. The physical reaction modulates the transmitted light which is reflected back towards a light detector and analyzed. The analysis may include detecting an acoustic signal source location and/or reconstructing the acoustic signal. A light scanner may be configured to transmit the light towards the plurality of acousto-optic retro reflectors in a predetermined, continuance, or dynamically determined sequence.

36 Claims, 10 Drawing Sheets

FREE-SPACE OPTICALLY ACCESSED ACOUSTICALLY MODULATED RETRO-REFLECTOR ARRAYS

BACKGROUND

Many traditional techniques for analyzing audio (e.g., for reconstructing an audio signal, detecting the location of the source of an audio signal, etc.) utilize a directional microphone. According to these techniques, it may be necessary to orient the directional microphone in the direction of the source of the audio signal or alter the orientation of the microphone if the source changes its position. Additionally, a directional microphone may be cost prohibitive, intrusive, and aesthetically displeasing. An array of fixed-position microphones may be arranged and used to analyze audio via a beamforming process, such that a steerable, high directional response may be achieved without mechanical motion. An array of fixed-position microphones may be cost prohibitive, unacceptably large, require connecting multiple microphones to processing electronics, and require processing the multiple signals received from the multiple microphones. Additionally, the most acoustically advantageous location to place a microphone is generally the most visibly obvious and it is difficult to conceal an array of microphones due to their size.

Generally, a microphone that is concealed in objects such as table lamps has a high probability of being located close to large acoustically hard objects. Microphones placed near a large acoustically hard surface, such as a wall, generally suffer from erratic frequency response due to the constructive and destructive interference between sound waves from the room impinging directly on the microphone and reflecting off the surface prior to impinging the microphone. Comb filter and other effects which degrade analytical performance may result from the erratic frequency response.

BRIEF SUMMARY

According to implementations of the disclosed subject matter, an arrangement may include a plurality of acousto-optic retro reflectors, each of which is configured to physically react to an acoustic signal. A light scanner configured to transmit light towards each of the plurality of the acousto-optic retro reflectors individually in a repeating sequence and a light detector configured to receive light emitted by the light scanner that is acoustically modulated and reflected by the plurality of acousto-optic retro reflectors may also be included. Additionally, a processor may determine at least one physical property of the acoustic signal. The determination may include detecting the location of the source of an acoustic signal and/or reconstructing the acoustic signal.

According to implementations of the disclosed subject matter, a light may be transmitted towards each of a plurality of acousto-optic retro reflectors, each of which is configured to physically react to the acoustic signal. The light may be modulated by at least one of the plurality of acousto-optic retro reflectors based on the physical reaction. The acoustically modulated form of the transmitted light may be received and analyzed.

Systems and techniques according to the present disclosure allow for a light to be transmitted towards a plurality of surfaces that change shape or other physical property based on an acoustic signal. The change in shape or other physical property may modulate the light that is reflected back towards a light detector, and the modulated light is then analyzed. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
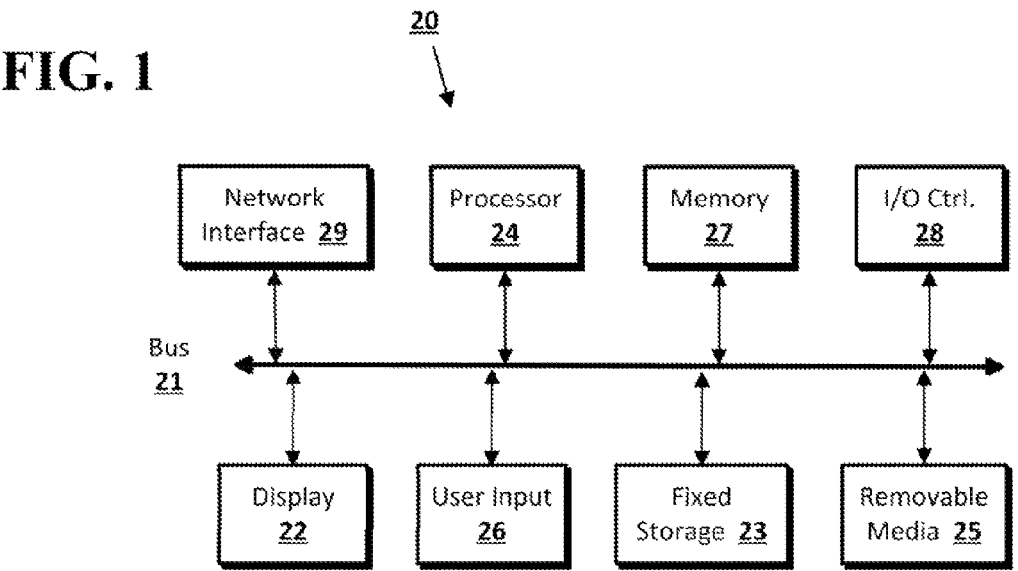
FIG. 1 shows a computer according to an implementation of the disclosed subject matter.

Arranging a plurality of passive acousto-optic retro reflectors in a given space may allow for acoustic signal analysis to be conducted without including a conventional microphone in the arrangement. An acousto-optic retro reflector may be configured to be affected by an acoustic signal and to reflect a modulated light based on the acoustic signal. Notably, the reflectors may be passive, so that they need not require power or signal connections, which may allow them to be visually unobtrusive and be placed in advantageous locations. As an example, a plurality of acousto-optic retro reflectors may be placed on the top portion of one or more walls in a conference room such that they are not instantly obvious to a casual observer. The acousto-optic retro reflectors may react to an acoustic signal (e.g., vibrate) such that incident light is modulated based on the reaction. Continuing the previous example, the plurality of acousto-optic retro reflectors may vibrate when a speech is output by an individual in the conference room. A light scanner may be configured to emit a light, such as a laser, towards each of at least a subset of the acousto-optic retro reflectors. The light scanner may be positioned such that it is within the line of sight of at least the subset of the acousto-optic retro reflectors. Continuing the example, a light scanner may be centrally located on the ceiling of the conference room such that there are no objects or individuals that block the line of sight between the light scanner and the plurality of acousto-optic retro reflectors. As a result of the physical reaction of an acousto-optic retro reflector, the light transmitted by the light scanner may be modulated by the acousto-optic retro reflector and the modulated light may be reflected back towards a light detector. The light scanner and the light detector may be a single unit such that the light is emitted by and reflected toward the same unit which transmitted the original light. The modulated light received by the light detector may be analyzed by a processor such that a location of a source of an acoustic signal may be detected based on the analysis and/or the acoustic signal may be reconstructed and made available digitally. Continuing the example, the light scanner may transmit a laser light towards each of three acousto-optic retro reflectors and may receive respective modulated light from the reflectors. Analyzing the received modulated light may allow the arrangement to reconstruct what the speaker said and create and store an audio file based on the reconstruction. Additionally, the arrangement may determine the location of the speaker based on the received signal as well as the location of the acousto-optic retro reflectors that reflected the modulated light towards the light detector. Notably, modulated light reflected by multiple acousto-optic retro reflectors may be detected and de-multiplexed by a single light detector (e.g., by software, in the digital domain). Further, a single analog-to-digital converter may be utilized to analyze the multiple reflected modulated lights, effectively reducing system complexity.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
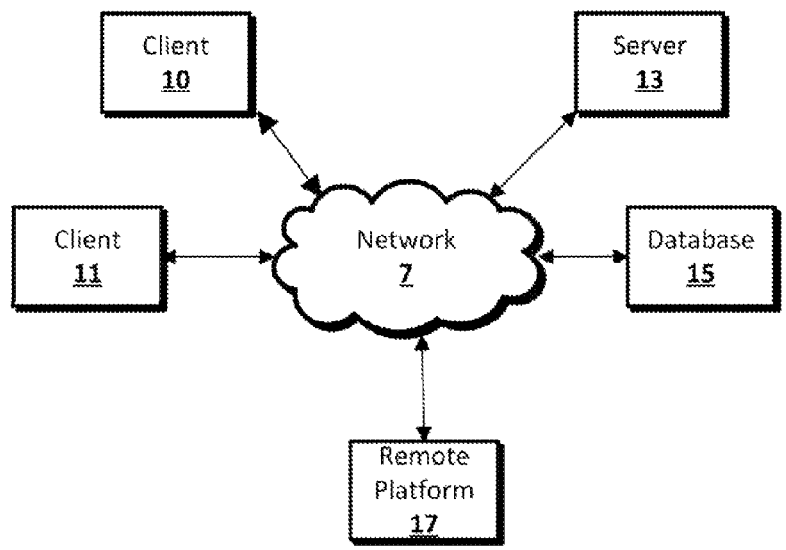
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The modulated light received by one or more light detector may be analyzed via a beamforming process such that two or more of the modulated light signals are received from two or more respective acousto-optic retro reflectors. The modulated light signals may be combined in a way as to produce a desired spatial response pattern which may maximize the response a first direction while minimizing the response on a second or all other directions. As an example, the acousto-optic retro reflectors may be arranged in a line, spaced at regular intervals such as in an "end-fire array" (i.e., the main axis of sensitivity is along a line of elements) or a "broadside array" (i.e., the main axis of sensitivity is perpendicular to a line of elements).

When sound waves emanate from a small omnidirectional source, the wavefronts are generally spherical. Accordingly, the radius of curvature increases as the wave propagates outward and may be neglected as the wave reaches the light detector and, hence, a planar wavefront approximation may be applied when analyzing such waves. If an array (e.g., acousto-optic retro reflectors arranged in a line) is parallel to the wavefront (i.e., the axis of the array is perpendicular to the line from the center of the array to the sound source), then it may be determined that, given the planar approximation, that the microphone elements will receive the same sound pressure at any given instant. Conversely, if the sound source and array are not so aligned, then a particular wavefront may reach one end of the array first, and progressively arrive at the other elements in succession. Assuming that the wavelength is large with respect to the overall array length, the outputs of all of the microphone elements may be summed together equally with no additional delays. Here, while a peak of the wave is at one element, the pressure at other elements may be less, and the overall response may be less than in the perpendicular case where all elements experience the peak pressure simultaneously. As the wavelength decreases, it may become more apparent that the relationship between the wavelength and the inter-element spacing of the array is a critical parameter. In particular, it may become apparent that when the wavelength is less than half of the inter-element distance, spatial aliasing arises just as temporal aliasing arises in temporally sub-sampled systems.

FIGS. 8a, 8b, 8c, and 8d show the relationship between inter-element spacing (Lo) and a beam pattern for an 8-element constant-spaced broadside linear array. Here, the spacing is one wavelength, at 4000 Hz. It should be apparent that, although in this sequence the spacing is held constant and the wavelength of sound is varied, exactly the same patterns would emerge by varying the spacing with a constant wavelength sound source. FIGS. 8a, 8b, 8c, and 8d correspond to a broadside array (i.e., the main axis of sensitivity is perpendicular to a line of elements). Therefore the elements are arranged along the Y (±90°) axis and the peak sensitivity occurs in a plane perpendicular to that axis (the XZ plane). Only half of the response envelope is shown. An arrangement where the microphone elements are truly omnidirectional in themselves may result in a response that is symmetrical about the vertical axis. Thus, in the 100 Hz plot a surface of equal amplitude response would be approximately a sphere, and in the 500 Hz plot it would be a slightly misshaped torus.

Figure 8A:
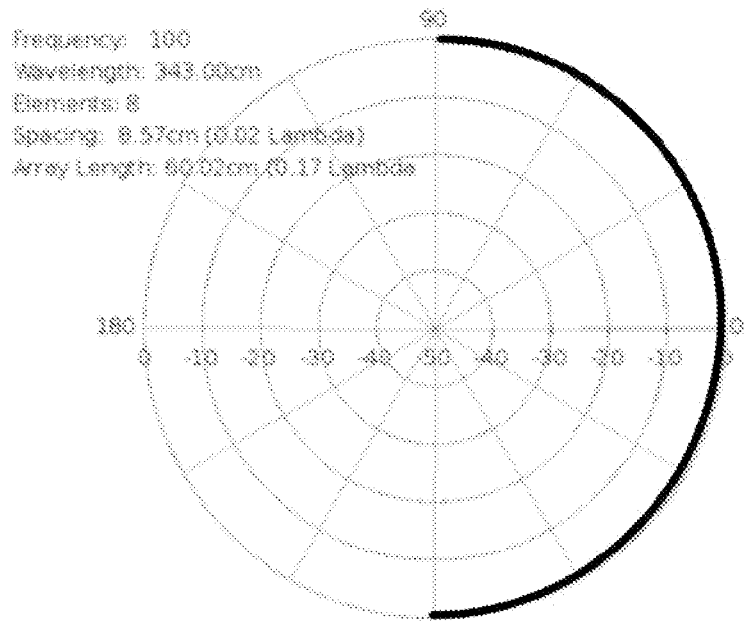
FIG. 8a shows an example plot showing the relationship between inter-element spacing and a beam pattern at 100 Hz, according to an implementation of the disclosed subject matter.
Figure 8B:
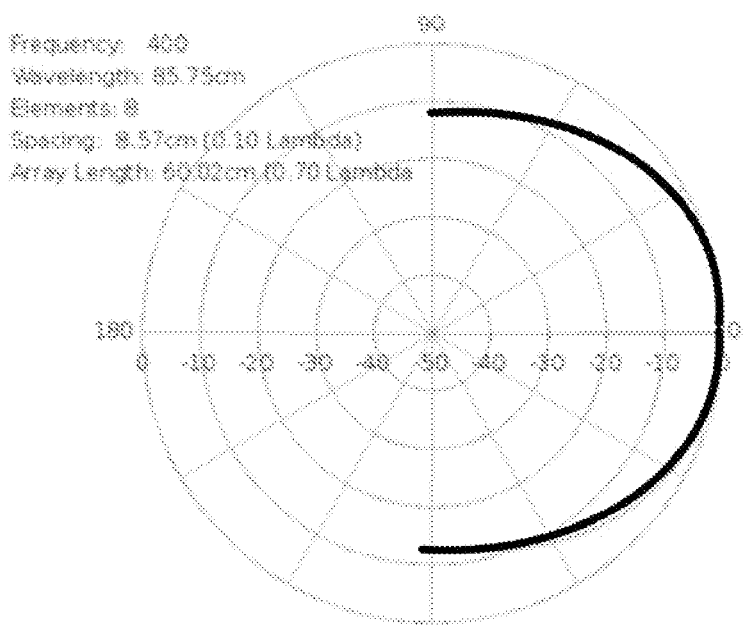
FIG. 8b shows an example plot showing the relationship between inter-element spacing and a beam pattern at 400 Hz, according to an implementation of the disclosed subject matter.
Figure 8C:
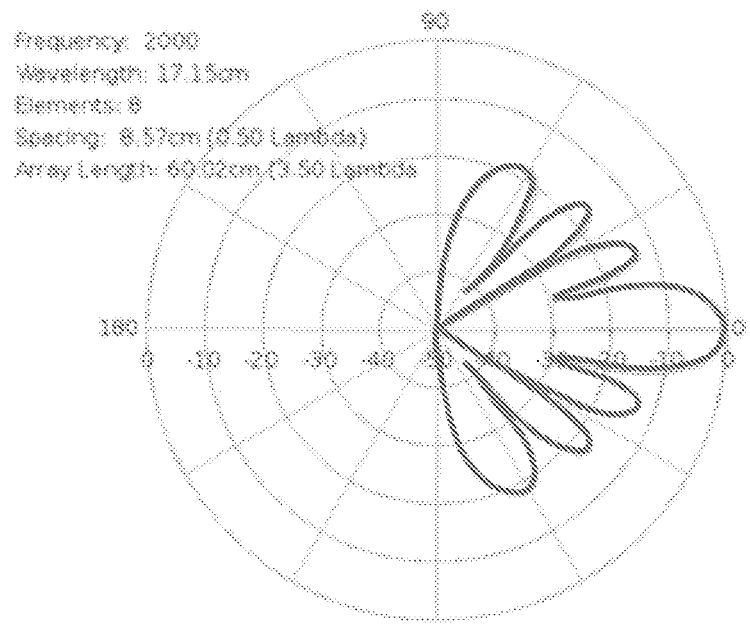
FIG. 8c shows an example plot showing the relationship between inter-element spacing and a beam pattern at 2000 Hz, according to an implementation of the disclosed subject matter.
Figure 8D:
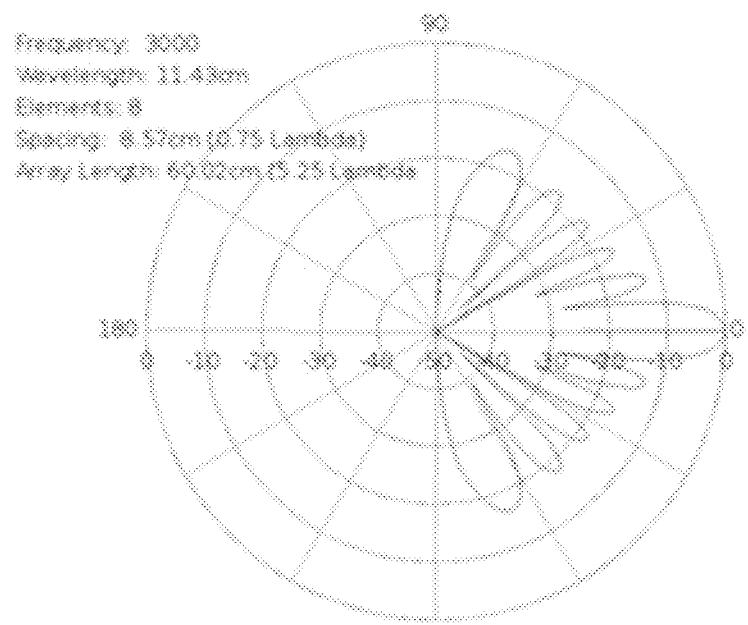
FIG. 8d shows an example plot showing the relationship between inter-element spacing and a beam pattern at 3000 Hz, according to an implementation of the disclosed subject matter.

In FIG. 8a, at 100 Hz, the spacing is 0.02 of a wavelength (Le=0.02λ). As shown, there is minimal to no directivity. At this frequency the array may be equivalent to a single microphone, though in some implementations there may be an improvement in signal to noise ratio due to the increased amount of sound energy captured by the multiple elements, as compared to a single element. In FIG. 8b, at 400 Hz, the spacing is 0.01 of a wavelength (Le=0.10λ). As shown, there is a higher amount of directionality in comparison to at 100 Hz such that the response at ±90° has dropped by around 12 dB. In FIG. 8c, at 2000 hz, the spacing is 0.5 of a wavelength (Le=0.50λ). As shown, multiple lobes and nulls are created such that the side lobes decrease in magnitude as their angular distance from the main lobe increases. In FIG. 8d, at 3000 hz, the spacing is 0.75 of a wavelength (Le=0.750λ). As shown, there is further narrowing of the main lobe, however the response of the side lobes no longer decreases monotonically with the distance from the main lobe.

As a fixed-spaced linear array may not be optimal at all frequencies of interest for speech processing or more broadband audio applications. Two or more arrays (e.g., two sets of acoustically modulated retro reflectors) may be superimposed, each optimized for a particular range of frequencies. As disclosed herein, in a continuously sensitive retro-reflective surface the array spacing may be varied dynamically without the need for predefined geometries. Additionally, with multiple array spacing, the spatial response pattern may be optimized for each frequency sub-band.

In a conventional sound processing system, the output of an analog microphone may be fed into an analog-to-digital converter (ADC), and the bulk of the signal processing may be done in the digital domain. Here, the ADC (or, commonly, a sample-and-hold circuit at the input of the ADC) may perform a temporal sampling function. Any sampling process may fall under a Nyquist sampling theorem such that in order to avoid aliasing artifacts the sampled signal must be band limited to one half of the sample rate. In a microphone/ADC configuration, there is an opportunity to band-limit the output of the microphone before it is sampled, and this may be done by inserting an anti-aliasing low-pass filter at the ADC input.

As disclosed herein, in an array of optically scanned microphone elements the scanning process itself is inherently a temporal sampling process, and will therefore immediately introduce aliasing if the microphone elements are responsive to sound energy with frequencies greater than the Nyquist frequency, and such energy is present in the environment. The only opportunity to filter out higher frequency acoustical energy is thus within the microphone elements themselves. As an acoustically modulated retro-reflector contains mechanical components, the means to tailor its frequency response may also be mechanical. The frequency response may be tailored by controlling the mass, stiffness, and/or damping of some or all of the structures that are set in motion by acoustical energy.

A compound array may contain elements that are dedicated to lower frequency sounds and others to higher frequency sounds. There may be some advantages to sample the low frequency elements less often than the high frequency elements. This may result in fewer analog-to-digital conversions per second, possible savings in the optical scanner, and the like. Notably, during mixed-rate scanning, the microphone elements may have their frequency responses tailored to their scanning rate. In some cases, the necessity to create various forms of microphone elements may be more burdensome than scanning all elements at the highest rate.

Delay inserted into a signal path of an individual microphone (e.g., acousto-optic retro reflector) before the summing point is equivalent to that same delay caused due to propagation of the sound waves through air. Since the directionality of microphone arrays arises from the differing propagation times to the various microphone elements for sound waves arriving from different angles, by properly adjusting processing delays across the array, the equivalent of physically rotating the array in space can be attained with no actual physical movement. This process is known as "beam steering".

In the optically scanned array, individual microphone elements may be scanned in sequence such that there is a different delay in the signal path for each element relative to the start or end of the scanning cycle (i.e., the different elements are necessarily sampled at different points in time). To compensate for this and achieve the equivalent of simultaneous sampling of all of the elements, a progressively longer compensating delay may be added to each path in the sequence such that at the end of a scan cycle all of the sample data are properly aligned in time. These delays may then be additionally modified to effect any desired beam steering.

An end-fire array (i.e., the main axis of sensitivity is along a line of elements) may produce a focused response in both azimuth and elevation; however the main lobe may be constrained to be aligned with the array axis and is not electronically steerable. A two-dimensional array may be implemented to overcome this constraint. Some or all relationships between sound wavelength and element spacing may apply to both dimensions. Here, arranging acousto-optic retro reflectors instead of conventional microphones may reduce the cost of the two-dimensional arrays and may improve the aesthetics of the array.

Figure 3:
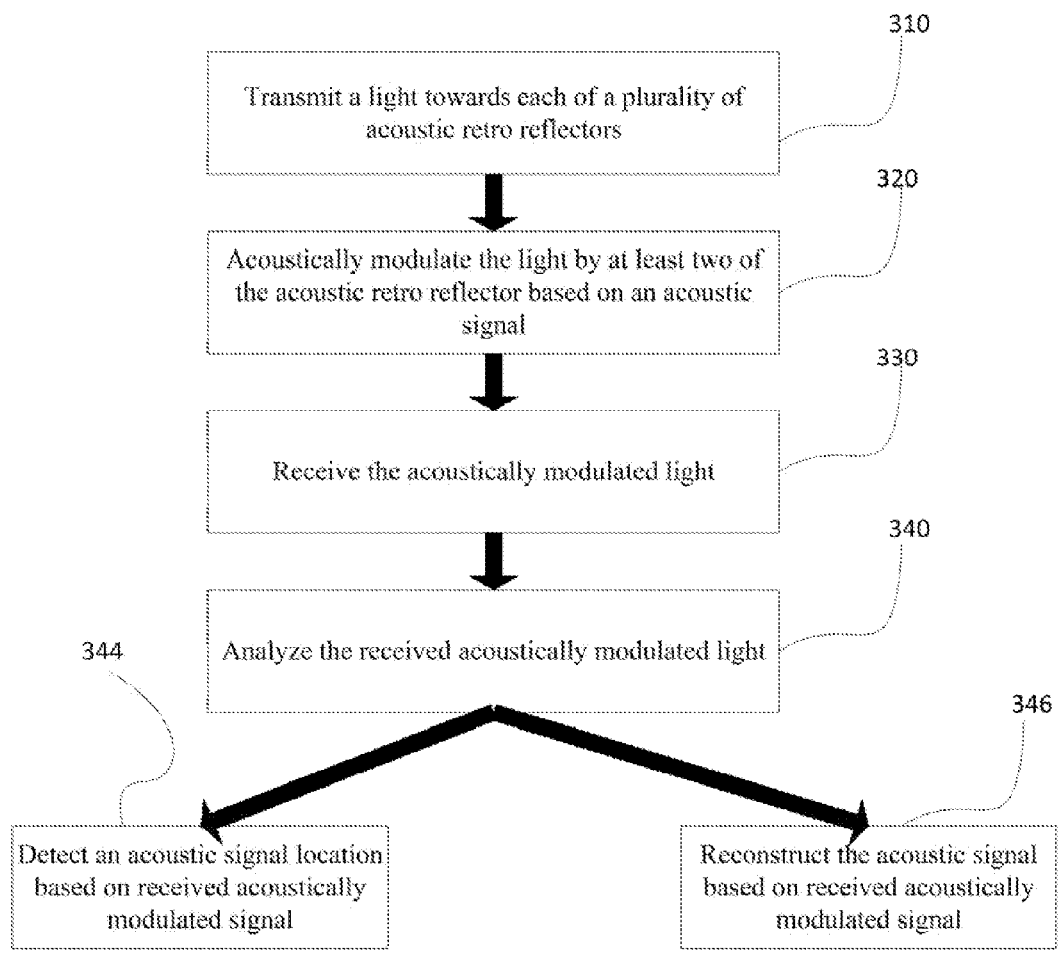
FIG. 3 shows an example process for analyzing acoustically modulated light, according to an implementation of the disclosed subject matter.

According to an implementation of the disclosed subject matter, as shown in FIG. 3 at step 310, light may be transmitted towards a plurality of acousto-optic retro reflectors. The light may be any applicable light that can travel through a medium such as free-space (e.g., through an open air space without being contained in a carrier such as an optical fiber cable) and can be modulated and reflected by the acousto-optic retro reflectors. Additionally, the light may be transmitted towards the retro reflectors independent of a light reflected by a retro reflector (e.g., no feedback loop may be required to determine a property of the transmitted light). The light source may be a laser light such as a gas laser, a chemical laser, an excimer laser, a solid-state laser, a fiber laser, a photonic crystal laser, a semiconductor laser, a dye laser, a free electron laser, a bio laser or the like. The light may be transmitted toward one or more retro reflectors at a predetermined time (e.g., at a preset time, at the expiration of a time, at a programmed time, a time based on an external factor, etc.), when a user requests the arrangement to initiate acoustic signal analysis, when an event occurs (e.g., a motion sensor senses movement in a room, a light sensor is triggered, power is provided to the arrangement, etc.), or the like. The light scanner may transmit the light towards the plurality of acousto-optic retro reflectors based on a sequence as disclosed herein. A light scanner may receive location information regarding the location of an acousto-optic retro reflector and transmit light towards the reflector based on the location information. The location information may be received from a user, determined by a calibration technique (e.g., transmitting a test signal and storing an acousto-optic retro reflector location if the test signal is reflected back, manually directing the light scanner and storing the location information, etc.), received from a controller configured to determine and provide the location of the acousto-optic retro reflector, or the like. Additionally, the light scanner may transmit the signal in a specific direction by mechanically rotating or otherwise redirecting at least a portion of the light scanner. For example, a light scanner may transmit light towards a first reflector and the casing encompassing the light sensor may rotate such that the light scanner rotates, prior to transmitting light towards a second reflector. As another example, the light scanner may be capable of changing the direction of transmitted light without moving the casing encompassing the light scanner. Notably, the acousto-optic retro reflectors may be arranged as a single or multi-dimensional array. More specifically, the acousto-optic retro reflectors may be arranged in an end-fire array configuration or a broadside array configuration based on the subsequent signal processing, as disclosed herein.

According to an implementation of the disclosed subject matter, as shown in FIG. 3 at step 320, an acousto-optic retro reflector may receive a light and modulate the light based on an acoustic signal. The acoustic signal can be any signal that is capable of causing the acousto-optic retro reflector to physically react and may originate from any applicable source such as an individual (e.g., a human, an animal, etc.) an audio speaker, a vibration source, or the like. An acoustic signal may be an aggregation of two or more signals originating from two or more sources. For example, two individuals in a room may speak at the same time, resulting in an acoustic signal containing properties of sounds from both individuals to reach an acousto-optic retro reflector. As disclosed herein, an acousto-optic retro reflector may be physically react based on an acoustic signal. Additionally, properties of an acousto-optic retro reflector may enable the reflector to filter out one or more ranges of acoustic signals by not modulating a received light based on the unwanted signals. As an example, an acousto-optic retro reflector may be composed of a material that physically reacts when a signal with a frequency between 300 and 3000 Hz is received by the reflector. However, the reflector may not physically react if a signal with a frequency of 3600 Hz is received by the reflector. Notably, a physical or material property of an acousto-optic retro reflector may allow for automated filtering of sounds that are not intended to be analyzed such as mechanical components (e.g., HVAC machinery, appliances, electronics, etc.), audience noise, movement, or the like.

Figure 4A:
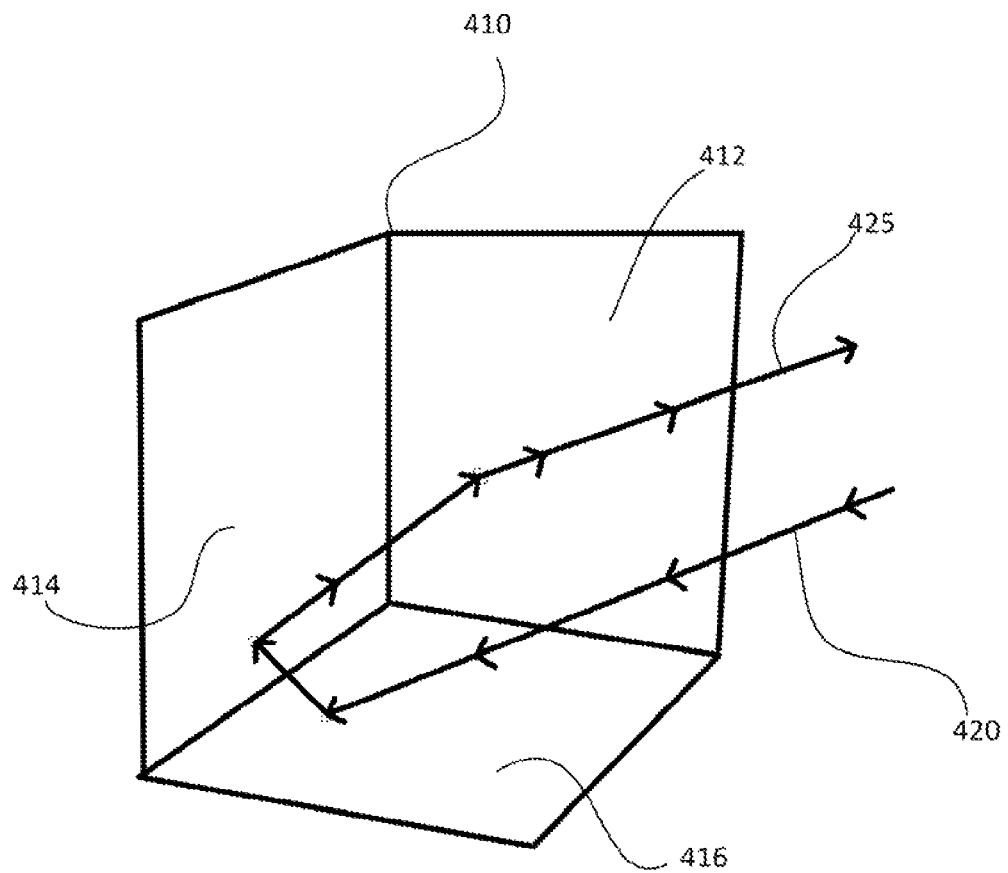
FIG. 4a shows an example illustration of a corner cube acousto-optic retro reflector according to an implementation of the disclosed subject matter.
Figure 4B:
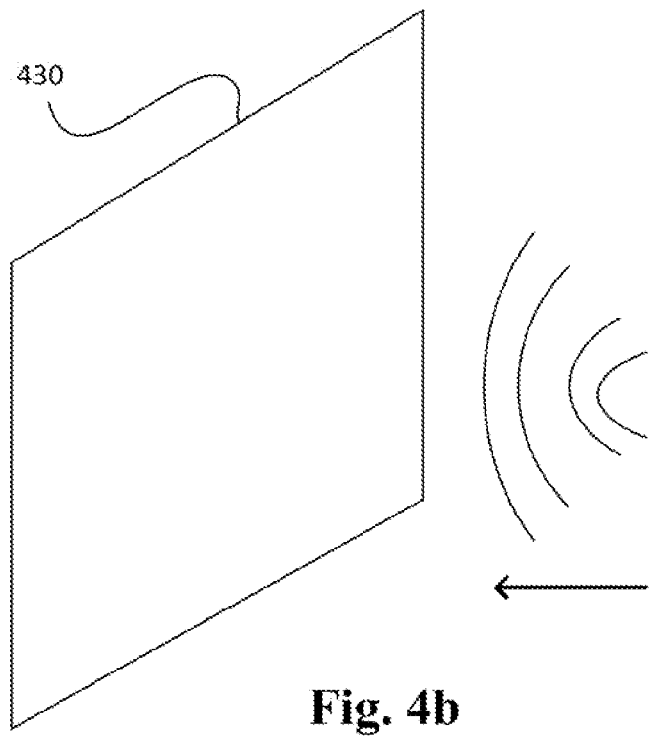
FIG. 4b shows an example illustration of a plane from an acousto-optic retro reflector according to an implementation of the disclosed subject matter.
Figure 4C:
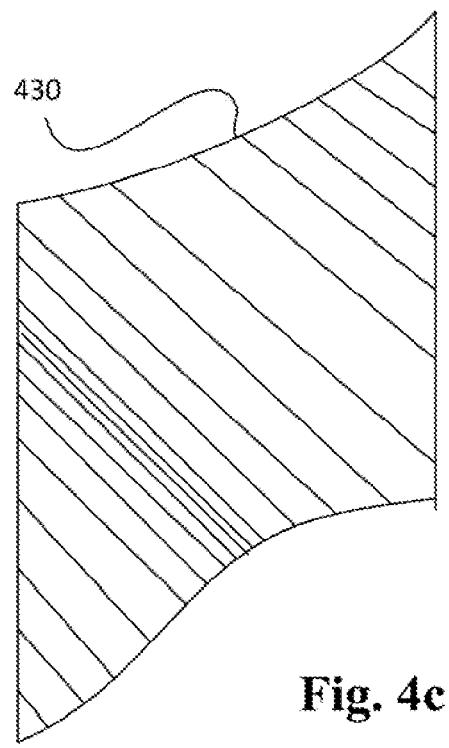
FIG. 4c shows an example illustration of a vibrating plane from an acousto-optic retro reflector according an implementation of the disclosed subject matter.
Figure 5:
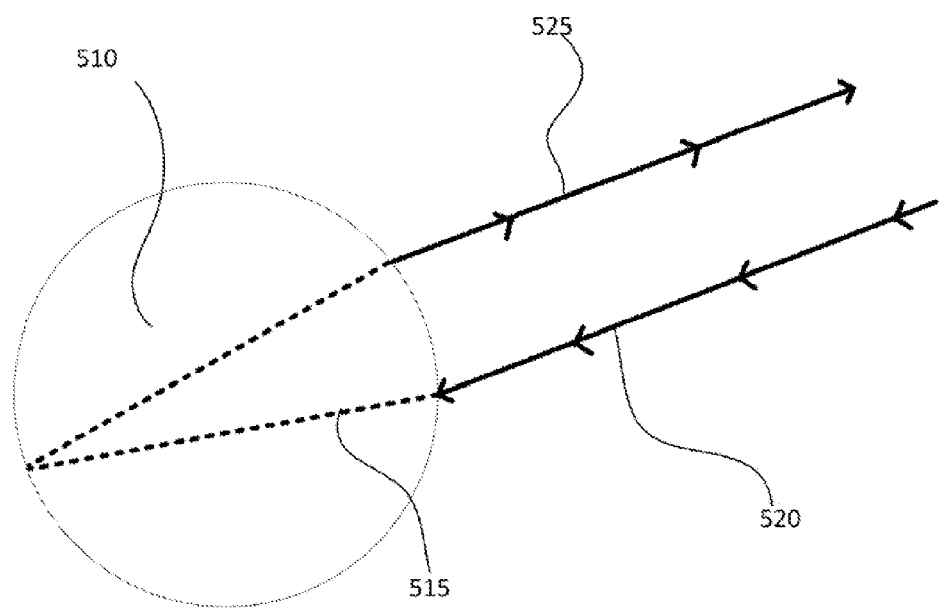
FIG. 5 shows an example illustration of a spherical acousto-optic retro reflector according to an implementation of the disclosed subject matter.

An acousto-optic retro reflector may physically react to an acoustic signal such that incident light is modulated based on the reaction. The physical reaction may be any applicable reaction such as a vibration (e.g., vibrating at a rate based on the frequency and/or amplitude of an acoustic signal), deformation (e.g., a bend, twist, strain, shift, etc.), or the like. An acousto-optic retro reflector may physically react directly, by making the optical surface of a material and structure that is responsive to an acoustic signal or, alternatively, a subset of the acousto-optic retro reflector may physically react. As an example, as shown in FIG. 5, a spherical acousto-optic retro reflector 510 may be a single piece of material that is capable of deforming and reflecting a light 525. Accordingly, the entire spherical acousto-optic retro reflector may change its physical shape based on an acoustic signal, causing a modulation of the received light 520 based on an acoustic signal. As another example, as shown in FIG. 4a, FIG. 4b, and FIG. 4c, a corner cube acousto-optic retro reflector may contain three structural walls 412, 414, and 416 as well as a diaphragm 430 coupled to each wall. The structural walls may remain rigid relative to the diaphragms coupled to the walls. As shown in FIG. 4b, prior to an acoustic signal reaching a diaphragm, the diaphragm may be in a resting state such that a light reflected by the corresponding acousto-optic retro reflector would not be acoustically modulated when reflected by the reflector. As shown in FIG. 4c, receiving an acoustic signal can cause a diaphragm to physically react based on one or more characteristics of the acoustic signal. The subset of the acousto-optic retro reflector, such as a diaphragm, that physically reacts may not be optically reflective or need to be directly exposed to a light for the light to be modulated.

An acoustic signal may cause an acousto-optic retro reflector to modulate a light in any appropriate manner such as by modifying amplitude, polarization, wavelength, or the like. An acousto-optic retro reflector's surface may return incident light to its source if the angle of incidence is normal to the surface or if there is a variation in the angle of the surface with respect to the incident light. Accordingly, a light beam reflected by a reflector that has not physically reacted to an acoustic signal will differ from a light beam reflected by a reflector that has physically reacted to an acoustic signal. Similarly, a non-normal light beam reflected from a reflector with no physical reaction will differ from a non-normal light beam reflected from a reflector with a physical reaction due to an acoustic signal. As an example, a light scanner located in the middle of a conference room may transmit a laser light towards an acousto-optic retro reflector on a wall in the conference room. The acousto-optic retro reflector may be a spherical bead which reflects a light with a first modulation back when a low pitch humming acoustic signal is received by the bead. A higher pitch audio signal generated as a result of an individual speaking in the conference room may cause a different distortion in the shape of the spherical bead and, accordingly, a reflected light with a different modulation may be returned. As disclosed herein, the arrangement may conduct an analysis of the variation in the modulated reflected light and, based on the analysis, may provide any applicable result such as a reconstructed audio signal or a speaker location.

Figure 7A:
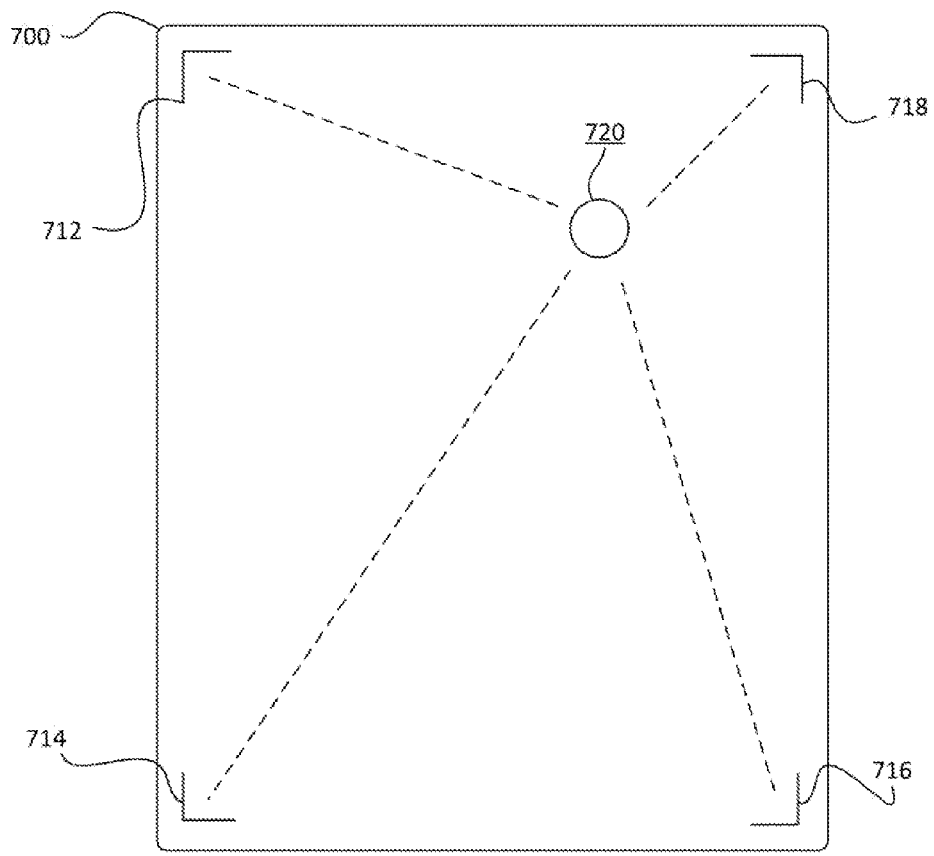
FIG. 7a shows an example illustration of discrete acousto-optic retro reflectors according to an implementation of the disclosed subject matter.

According to an implementation of the disclosed subject matter, multiple acousto-optic retro reflectors may be placed in a given area and distinctly and individually accessed by a light scanner. As disclosed herein, the acousto-optic retro reflectors may be arranged a single or multi directional array. The structure and location of each individual reflector may be defined by an explicit process and the size and placement of the structures may define the acoustical geometry of the system. Essentially, the modulated light signals modulated by the acousto-optic retro reflectors and received by a light detector may be analyzed in such a way as to produce a desired spatial response pattern. As an example, as shown in FIG. 7, four corner cube acousto-optic retro reflectors 712, 714, 716, and 718 may be placed on each corner of a room 700 and the light scanner and detector may be directed to each reflector in turn, at a rate such that each sensor is visited at least twice in each cycle time of the highest frequency of interest. The corner cube reflectors may modulate a light from a light scanner (not shown) based on the acoustic signal resulting from a speaker speaking at a location 720 near the north east corner of the room. A resulting modulated light may then be analyzed in view of the specific acoustical geometry of the system. Continuing the example, the speakers location 720 may be identified based on comparing the different amplitudes of modulated light received from each of the corner cube reflectors. Corner cube reflector 718 may experience the most drastic physical reaction based on its proximity to the speaker location 720 whereas corner cube reflector 714 may experience the least drastic physical reaction based on being the furthest reflector from the speaker location 720. The light directed towards each reflector, from a light scanner, may be modulated respective to the level of physical reaction such that the light reflected from corner cube reflector 718 may be most modulated and the light reflected from corner cube reflector 714 may be least modulated. Accordingly, the arrangement may determine that the speaker is located at location 720 based on the variation in modulation between the four corner cube reflectors. As a related example, if the speaker was located directly in the center of a square room, with four acousto-optic retro reflectors located at the four corners of the room, each reflector may receive a similar audio signal and, thus, each reflector may modulate a light in the same manner. Based on the similarly modulated reflected light by all four reflectors, the arrangement may determine that the speaker is located in the center of the room.

Distinctly placed acousto-optic retro reflector may include any applicable reflector such as a corner cube acousto-optic retro reflector. As shown in FIG. 4a, a corner cube acousto-optic retro reflector 410 may contain three mutually orthogonal reflective surfaces 412, 414, and 416 that form an interior corner, such as a corner in a cube. Light 420 may enter the corner cube reflector at any angle from a range of angles such that the light is reflected by up to three of the surfaces and reflected back 425 towards a light detector which may be located proximate to a light scanner that transmitted the original light. A corner cube acousto-optic retro reflector may physically react to an acoustic signal, as disclosed herein, and the physical change may result in a change in the reflection angle or of at least one surface and, hence, modulate the light returned towards the light detector. Similarly, an acoustic signal may cause at least one surface of a corner cube reflector to deform, causing a light beam to disperse, effectively modulating the light. Additionally, as disclosed herein, one or more of the surfaces in a corner-cube optic retro reflector may be coupled to a diaphragm that may modulate a light based on physical reactions.

Figure 7B:
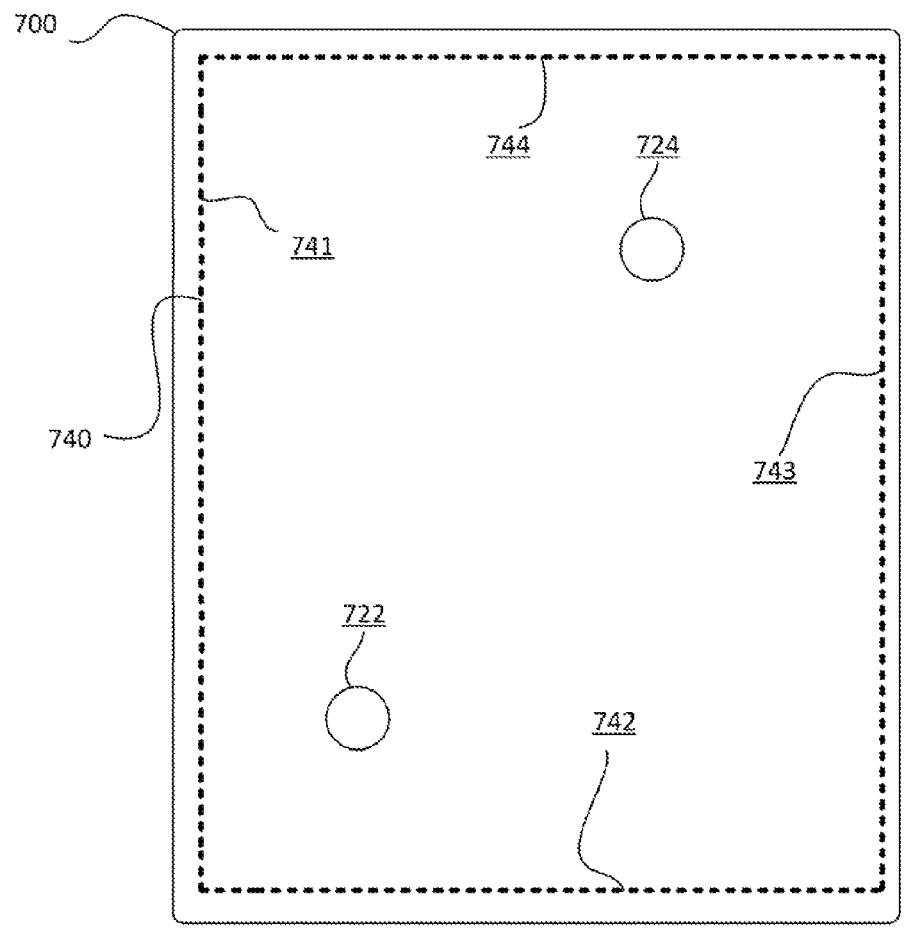
FIG. 7b shows an example illustration of continuous acousto-optic retro reflectors according to an implementation of the disclosed subject matter.

According to an implementation of the disclosed subject matter, a high density of smaller structures that effectively form a continuous, acoustically sensitive, optically retro reflective surface may be placed in a given area. Although optically retro reflectors are generally described herein as operating individually, it will be understood that the density of reflectors may be high enough that a light transmitted toward and reflected by the reflectors encompasses multiple reflectors. Accordingly, the acoustical geometry for continuously arranged reflectors may be defined by the geometry and scanning pattern of the light scanner and detector. Notably, the light scanner and detector may dynamically vary the acoustical geometry for analyzing audio signals in an area to optimize the analysis such as by varying the geometry when a line of sight connection cannot be established with one or more reflectors based on an original geometry, when a speaker changes locations, when an original geometry causes analyzing unwanted acoustic signals, when an original geometry utilizes a deformed reflector, or the like. For example, as shown in FIG. 7b, spherical bead reflectors may be placed continuously across the top of all four walls in a room 700. A speaker may originally be at location 722 and the arrangement may utilize optic retro reflectors located at points 741 and 742 to transmit light towards and receive a modulated light from. The speaker may shift her position to location 724 and, accordingly, the arrangement may dynamically adjust by utilizing reflectors located at points 743 and 744 to analyze the audio signal generated as a result of the speaker speaking Notably, in a continuously positioned reflector configuration the arrangement is not limited to a discrete set of reflectors and can optimize sound analysis by modifying a scan sequence.

Continuously placed acousto-optic retro reflectors may be any applicable optical retro reflector such as small spherical transparent beads. A spherical transparent bead may be constructed of any applicable acoustically compliant material such as a gel, glass, plastic, photonic materials including diffraction gratings, or the like and the retro-reflective properties of a the transparent sphere may depend on refraction as a beam of light enters and exits the sphere as well as internal reflection within the sphere. Any distortion of the sphere to a prolate or oblate speriod may affect the reflected light. As an example, as shown in FIG. 5, the shape of a glass spherical bead 510 may change based on an acoustic signal and, accordingly, a light 520 directed toward the sphere 510 may be modulated while traversing through the sphere 515, based on the deformed shape of the sphere.

According to an implementation of the disclosed subject matter, light may be modulated by interference caused by periodic structures with characteristic lengths on the order of the wavelength of the light in use. As an example, diffraction grating such as a Bragg diffraction grating may be used to produce an acousto-optic retro reflector effect such that an incident light is modulated based on an acoustic signal by using diffraction grating. An interference approach may produce a large change in amplitude (e.g., a physical shift on the order of half a wavelength), and may be relatively more sensitive in comparison to a geometric acousto-optic retro reflector.

According to an implementation of the disclosed subject matter, as shown at step 330 in FIG. 3, a light detector may receive modulated light from one or more optic retro reflectors. The modulated light may be converted to a digital signal using an analog-to-digital converter and the digital signal may be de-multiplexed (e.g., by using software). A stream of digital samples of various amplitudes, based on the modulation, may be analyzed by a processor at step 340. As shown at step 344, the processor may also receive the location of an optic retro reflector corresponding to a stream of digital samples and, based on the digital samples and the location, determine the source location of a sound. Alternatively or in addition, the digital samples may be used to reconstruct the audio signal, as shown at step 346, and may store the reconstructed audio signal using any applicable storage medium such as on a hard drive, local server, remote server, cloud based service, removable storage, flash drive, or the like, or may be provided to a processor for instant streaming. For example, multiple optic retro reflectors may be used to modulate a light signal based on a speech given by a speaker in a conference room and reflect the modulated light towards a light detector. The modulated light may be converted to a digital signal and analysis of the digital signal may enable a reconstruction of the speaker's speech. The digitally reproduced speech may be transmitted, via satellite, to a remote listening area where individuals unable to attend the speech may be exposed to the speech in an efficient manner.

According to an embodiment of the disclosed subject matter, the arrangement may be configured to modify the set of acousto-optic retro reflectors used to analyze an audio signal. The modification in the set of reflectors may facilitate the execution of a requirement or need of the arrangement or an individual. One or more acousto-optic retro reflectors may be added to the set of reflectors used to analyze an audio signal for any appropriate reason such as a break in line of sight with one or more reflectors, a request for a higher quality analysis, a below threshold analysis, or the like. As an example, an arrangement configured according to techniques disclosed herein may utilize four acousto-optic retro reflectors located in an office to analyze and reproduce acoustic signals within an office. The audio signals may be played back to the administrator who inputs a command to reconfigure the arrangement to produce higher quality reproductions of the acoustic signals. Accordingly, the arrangement may increase the number of acousto-optic retro reflectors from four to eight to increase the quality of the reproduced signals. An increase in the number of acousto-optic retro reflectors used to analyze audio signals may also result in a greater duration of time to analyze the audio signals. One or more spare acousto-optic retro reflectors may be removed from the set of reflectors used to analyze an audio signal for any appropriate reason such as a request for lower quality analysis, above threshold analysis, system overburdening, memory shortage, or the like. As an example, an arrangement configured according to techniques disclosed herein may utilize six acousto-optic retro reflectors located in a symphony hall to detect speaker location. The arrangement may experience a lag in providing location information due to the processor being overburdened by the amount of data provided by the six reflectors and, thus, the number of reflectors used may be reduced from six to four. The modification in the number of acousto-optic retro reflectors may be based on predetermined rules that are either defined by a user or manufacture or are dynamically established by the arrangement during a calibration or actual use stage.

According to an implementation of the disclosed subject matter, a light scanner may transmit light towards multiple acousto-optic retro reflectors based on a sequence. The sequence may be predetermined, a continuous scan, or determined dynamically. As disclosed herein, multiple acousto-optic retro reflectors may be discretely placed in a given space and the arrangement may be provided with or may determine their location. For example, a user may preprogram the discretely placed reflector information or, alternatively, the arrangement may determine and store the location information during a calibration scan of the room. The predetermined sequence of transmitting the light by the light scanner can be based on the reflector location information along with one or more rules that define parameters such as number of reflectors required, a quality threshold, system load threshold, or the like. As disclosed herein, a high density of small structures that effectively form a continuous, acoustically sensitive, optically retro reflective surface may be placed in a given area. A light scanner may emit a light towards the high density of small reflective structures in a continuous manner such that the time between emitting the light towards a first area and a subsequent area is null or negligible. The arrangement may analyze all the data received from the continuous scan or, alternatively, use a subset of the data received from the continuous scan. The subset of the data and/or the utilized reflectors may define the array topology and may be selected to optimize acoustic analysis. The selection of the data and/or utilized reflectors may be made based on any applicable factor such as a sound quality threshold, process time threshold, analysis quality, or the like. A light scanner may emit a light based on a dynamically determined sequence. The dynamic sequence may recognize available reflectors by transmitting a light towards an area and determining that a reflector is available at that area if a reflected light is received. Detection of reflectors may occur periodically based on a predetermined time interval or the time interval may be determined based on optimizing acoustic signal analysis, as disclosed herein. Notably, a dynamic sequence may be preferable in an environment where line of sight is likely to be interrupted. As an example, it may be preferable to utilize a dynamic sequence in an environment prone to insects that may interrupt the line of sight. A currently utilized set of optic retro reflectors in a dynamic sequence may define an array topology, as disclosed herein, and the reflected light may be analyzed in view of the array topology.

Figure 6:
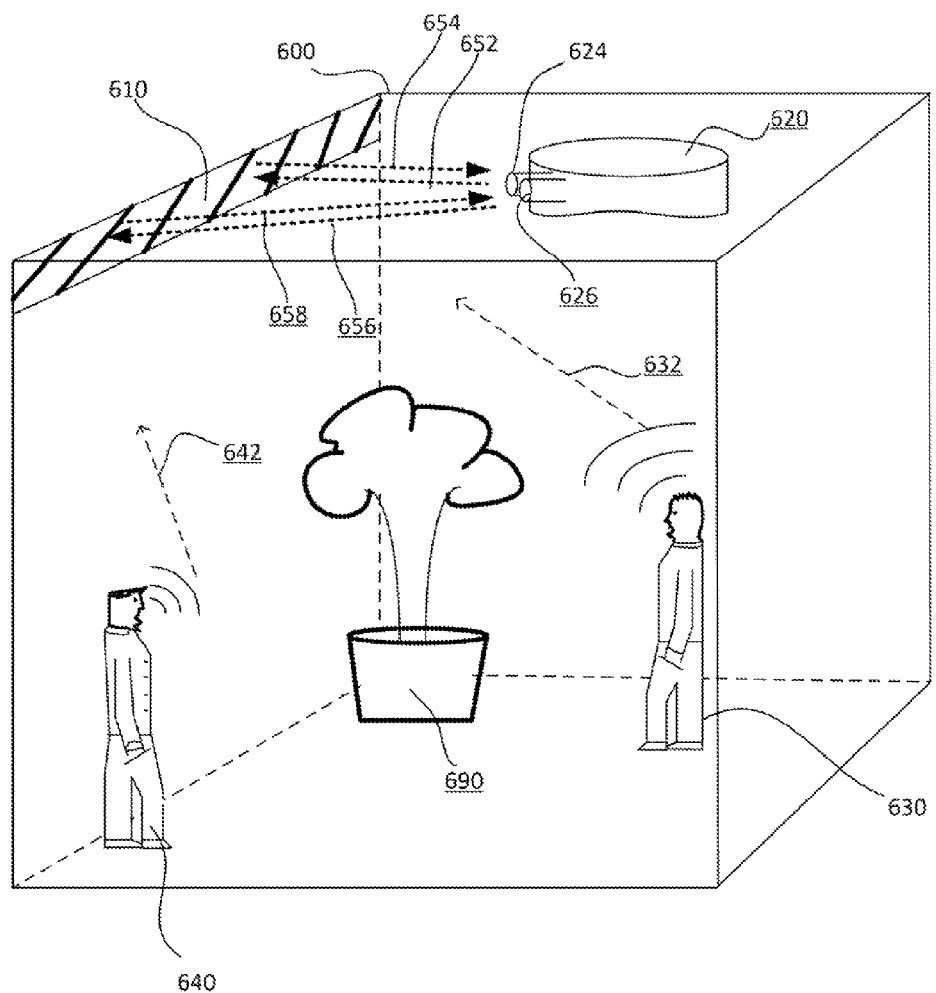
FIG. 6 shows an example illustration of analyzing acoustic signals according to an implementation of the disclosed subject matter.

In an illustrative example of the disclosed subject matter, as shown in FIG. 6, an acoustic signal may be generated as a result of a first individual 630 and a second individual 640 speaking in a room 600. The acoustic signal may be received by spherical transparent beads 610 placed on the top portion of a wall in the room 600. An acoustic analysis unit 620 may transmit a first light beam 658 via a light scanner 624 towards a first section of the beads. The first light beam 656 may be modulated by the first section of the beads and the modulated light beam 658 may reflect back towards the light detector 626. Subsequently, the acoustic analysis unit 620 may transmit a second light beam 652 via the light scanner 624 towards a second section of the beads. The second light beam 652 may be modulated by the second section of the beads and the modulated light beam 654 may reflect back towards the light detector 626. The analog modulated light beams may be converted to a digital signal which may be analyzed by a processor to reproduce the words spoken by both the first speaker 640 and the second speaker 630. It should be understood that to reconstruct the audio signal, the acoustic analysis unit 620 may scan back and forth between the first and second area of the beads at a rate that is preferably greater than twice in each cycle time of the highest frequency of interest.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
   a plurality of acousto-optic retro reflectors, wherein each of the acousto-optic retro reflectors is configured to physically react in response to an acoustic signal;
   a light scanner configured to sequentially transmit a first light signal towards each individual acousto-optic retro reflector in the plurality of acousto-optic retro reflectors;
   a light detector configured to receive a second light signal emitted by the light scanner, wherein the second light signal is reflected by the plurality of acousto-optic retro reflectors; and
   a processor configured to determine at least one property of the acoustic signal based upon the second light signal received by the light detector.

2. The system of claim 1, wherein the plurality of acousto-optic retro reflectors are arranged as a one dimensional array.

3. The system of claim 1, wherein the plurality of acousto-optic retro reflectors are arranged as a multi-dimensional array.

4. The system of claim 1, wherein the plurality of acousto-optic retro reflectors are arranged as an end-fire array.

5. The system of claim 1, wherein the plurality of acousto-optic retro reflectors are arranged as a broadside array.

6. The system of claim 1, wherein the first light signal is a laser light.

7. The system of claim 6, wherein the laser light is emitted from a device in a group consisting of a gas laser, a chemical laser, an excimer laser, a solid-state laser, a fiber laser, a photonic crystal laser, a semiconductor laser, a dye laser, a free electron laser, and a bio laser.

8. The system of claim 1, wherein the plurality of acousto-optic retro reflectors are passive.

9. The system of claim 1, wherein the determining at least one property of the acoustic signal comprises detecting an acoustic signal source location.

10. The system of claim 1, wherein the determining at least one property of the acoustic signal comprises reconstructing the acoustic signal.

11. The system of claim 1, wherein the light scanner is further configured to transmit a light signal towards, and receive a light signal from, an additional acousto-optic retro reflector based on the determining at least one property of the acoustic signal.

12. The system of claim 1, wherein the light scanner is further configured to cease transmitting light towards, and receiving light from, a spare acousto-optic retro reflector based on the determining at least one property of the acoustic signal.

13. The system of claim 1, wherein the light scanner and the light detector are a single unit.

14. The system of claim 1, wherein the second light signal reflected by the plurality of acousto-optic retro reflectors is an acoustically modulated form of the first light signal emitted by the light scanner.

15. The system of claim 1, wherein the sequence is predetermined.

16. The system of claim 15, wherein the processor is further configured to determine at least one property of the acoustic signal based at least on the location of the plurality of acousto-optic retro reflectors and the predetermined sequence.

17. The system of claim 1, wherein the sequence is a continuous scan.

18. The system of claim 17, further configured to:
   establish an array topology based on the second light signal received as a result of the continuous scan; and
   determine at least one property of the acoustic signal based on array topology.

19. The system of claim 1, wherein the sequence is determined dynamically.

20. The system of claim 19, further configured to determine a sequence based on the light detector successfully receiving an acoustically modulated light signal from one or more of the plurality of acousto-optic retro reflectors, wherein the sequence incorporates at least the acousto-optic retro reflectors from which the light detector successfully received an acoustically modulated light signal.

21. The system of claim 20, further configured to:
   establish an array topology based on the location of the acousto-optic retro reflectors from which the light detector successfully received an acoustically modulated light signal; and
   determine at least one property of the acoustic signal based on array topology.

22. The system of claim 1, further configured to:
   determine an array topology based on the plurality of acousto-optic retro reflectors; and
   determine at least one property of the acoustic signal based on the array topology.

23. The system of claim 1, wherein the light source is separated from the plurality of acousto-optic retro reflectors by free-space.

24. The system of claim 1, wherein the light detector is separated from the plurality of acousto-optic retro reflectors by free-space.

25. The system of claim 1, wherein the light scanner is configured to transmit the first light signal independent of the second light signal.

26. The system of claim 1, wherein the light sensor is placed within a line of sight of the plurality of acousto-optic retro reflectors.

27. The system of claim 1, wherein an acousto-optic retro reflector in the plurality of acousto-optic retro reflectors is selected from the group consisting of a corner cube reflector and a spherical reflector.

28. A method, comprising:
   sequentially transmitting a light signal towards each individual acousto-optic retro reflector in a plurality of acousto-optic retro reflectors, wherein the plurality of acousto-optic retro reflectors is configured to physically react to an acoustic signal;
   receiving a modulated form of at least one transmitted light signal resulting from the physical reaction of at least one corresponding reflector of the plurality of acousto-optic retro reflectors; and
   determining at least one property of the acoustic signal based upon the modulated form of the at least one transmitted light signal.

29. The method of claim 28, wherein the plurality of acousto-optic retro reflectors is arranged as a one dimensional array.

30. The method of claim 28, wherein the plurality of acousto-optic retro reflectors is arranged as a multi-dimensional array.

31. The method of claim 28, wherein the plurality of acousto-optic retro reflectors is arranged as an end-fire array.

32. The method of claim 28, wherein the plurality of acousto-optic retro reflectors is arranged as a broadside array.

33. The method of claim 28, wherein the plurality of acousto-optic retro reflectors is passive.

34. The method of claim 28, wherein the determining at least one property of the received modulated form of the transmitted light signal comprises detecting an acoustic signal source location.

35. The method of claim 28, wherein the determining at least one property of the received modulated form of the transmitted light signal comprises reconstructing the acoustic signal.

36. The method of claim 28, wherein the light scanner and the light detector are a single unit.

* * * * *